United States Patent [19]
Hashimoto et al.

[11] Patent Number: 5,646,688
[45] Date of Patent: *Jul. 8, 1997

[54] VIDEO DECODER ARCHITECTURE USING SEPARATE SEMICONDUCTOR SUBSTRATES

[75] Inventors: Masashi Hashimoto, Ibaraki, Japan; Frank L. Laczko, Sr., Allen, Tex.

[73] Assignee: Texas Instruments Incorporated, Dallas, Tex.

[*] Notice: The term of this patent shall not extend beyond the expiration date of Pat. No. 5,608,459.

[21] Appl. No.: 487,258

[22] Filed: Jun. 7, 1995

Related U.S. Application Data

[63] Continuation of Ser. No. 107,098, Aug. 13, 1993.
[51] Int. Cl.[6] .................................................. H04N 7/32
[52] U.S. Cl. .................................. 348/402; 348/416
[58] Field of Search ................................ 348/402, 401, 348/400, 407, 413, 412, 416, 415, 409, 390, 384; 364/715.02

[56] References Cited

U.S. PATENT DOCUMENTS

| | | | |
|---|---|---|---|
| 4,367,490 | 1/1983 | Riederer | 348/620 |
| 5,159,451 | 10/1992 | Faroaudja et al. | 348/448 |
| 5,185,819 | 2/1993 | Ng et al. | 348/412 |
| 5,293,229 | 3/1994 | Iu | 348/415 |
| 5,317,397 | 5/1994 | Odaka et al. | 348/416 |

*Primary Examiner*—Tommy P. Chin
*Assistant Examiner*—Bryan S. Tung
*Attorney, Agent, or Firm*—Richard L. Donaldson; C. Alan McClure; Gerald E. Laws

[57] ABSTRACT

A video data processing system (10) has a first substrate (12) and a second substrate (14). A system decoder (16), input buffer (18) and parser (20) are formed on first substrate (12). The parser (20) retrieves video data information from an input data stream and feeds coefficients through a dequantization unit (22) and a transformation unit (24). In addition, motion vector information is output from the parser (20). The second substrate (14) comprises a plurality of picture frame buffers 38, 40 and 44. The frame buffers 38, 40 and 44 are used to store decoded video information. Motion compensation modules 26a and 26b are used to perform predicted calculations on the information received from the video data stream as well as other images that have already been decoded. A raster scan output buffer (46) is used to output the decoded video information.

14 Claims, 2 Drawing Sheets

VIDEO DECODER ARCHITECTURE USING SEPARATE SEMICONDUCTOR SUBSTRATES

This is a continuation, of application Ser. No. 08/107,098, filed Aug. 13, 1993.

TECHNICAL FIELD OF THE INVENTION

This invention relates in general to the field of data processing and more particularly to an improved video data decoding architecture.

BACKGROUND OF THE INVENTION

An important aspect of modern data transmission is the ability to compress and decompress data to provide for greater data transfer rates. These concerns are particularly apparent in dealing with video data transmission due to the large amounts of data involved. Full motion video involves the encoding, transmission, decoding and display of on the order of thirty frames or images per second depending upon the resolution and size of the image. The amount of data to be transferred involved in these applications can become quite large and hence the data transmission problem can become quite difficult.

The problems inherent in transmitting video data are aided by the fact that sequential frames of video data often have large amounts of redundancy in that the image does not change greatly from one split second to another. Because of this fact, differential signals can be encoded which communicate the differences between one frame of video data and a neighboring frame of video data. In addition, objects within a single image can be tracked and their motion can be expressed as a motion vector which can also be encoded. In this manner, the data needed to encode an object moving across an image can be greatly reduced by encoding the data associated with the object and then encoding motion vectors to indicate where the object has moved in sequential frames.

A significant amount of data processing is required to decode the compressed images, the prediction information expressed in differential data and the motion compensation vector information all of which are contained within a compressed and encoded data stream. The data processing involved in the decoding process involves significant memory access due to the fact that neighboring images are used during the decoding process. Due to the use of these various techniques of data compression, the ability to access memory has become a critical factor in the speed and operability of the video data decoding systems.

SUMMARY OF THE INVENTION

Accordingly, a need has arisen for a video data decoding architecture that allows for the use of the various data compression techniques, but provides sufficient processing speed by efficiently and quickly accessing the required memory systems.

In accordance with the present invention, a video data decoding architecture is provided which substantially reduces or eliminates disadvantages associated with prior architectures and methods of operation.

According to one embodiment of the present invention, a video data processing system is provided that comprises a parser circuit and a data transformation circuit formed on a first integrated semiconductor substrate. Motion compensation circuit and an image memory circuit are constructed on a second integrated semiconductor substrate.

According to a further embodiment of the present invention, a system decoder circuit and an input buffer circuit are also formed on the first semiconductor substrate. In addition, an output buffer circuit is formed on the second semiconductor substrate.

BRIEF DESCRIPTION OF THE DRAWINGS

A more complete understanding of the teachings of the present invention may be acquired by referring to the accompanying figures in which like reference numbers indicate like features and wherein.

DETAILED DESCRIPTION OF THE INVENTION

Figure 1:
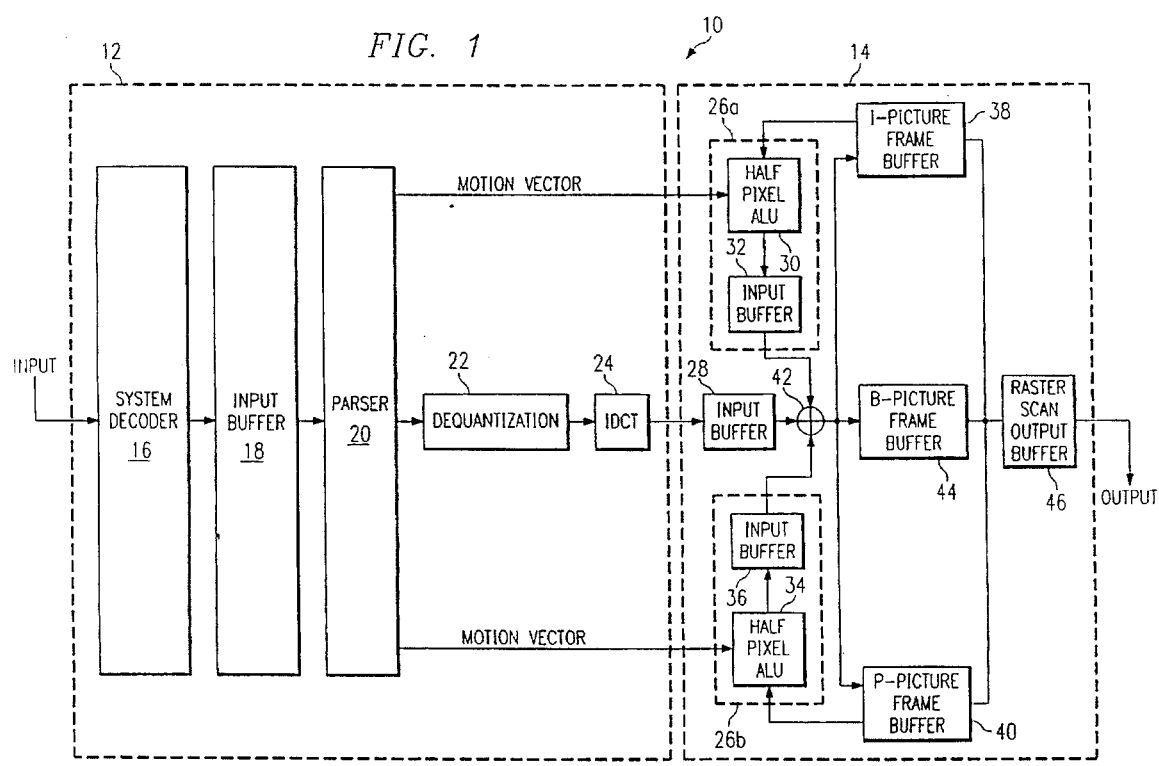
FIG. 1 is a schematic block diagram of the video data processing architecture constructed according to the teachings of the present invention.

FIG. 1 is a schematic block diagram of a video data decoding system 10. System 10 is operable to receive an encoded data stream which may comprise, for example, audio and video data encoded using the MPEG syntax. The system 10 is operable to extract a particular video channel from the encoded data stream and to decode the extracted channel and output decoded frames of video data for display.

An important technical advantage of the present invention inheres in the fact that system 10 is formed on a first semiconductor substrate 12 and a second semiconductor substrate 14. The advantages of this architecture will be described more completely herein, however, generally the subdivision of the components of system 10 between substrates 12 and 14 allow for the most efficient operation of system 10 due to the minimization of data transfer external to substrates 12 and 14. Data transfer outside of a semiconductor substrate may require the formation and operation of an external bus. External buses are inherently slower than buses internal to a semiconductor substrate and are expensive in terms of cost and size required for the implementation of the external bus in an integrated system.

Referring again to FIG. 1, system 10 comprises a system decoder 16 which is operable to receive the encoded input data stream. System decoder 16 may comprise an architecture and circuit similar to the system decoder circuit described with reference to FIG. 2 in U.S. patent application Ser. No. 08/021,007 entitled "Integrated Audio Decoder System and Method of Operation"; U.S. patent application Ser. No. 08/054,127 entitled "Audio Decoder Circuit and Method"; U.S. patent application Ser. No. 08/054,768 entitled "Hardware Filter Circuit"; and U.S. patent application Ser. No. 08/054,126 entitled "System Decoder Circuit and Method of Operation", (hereinafter referred to as "the Audio Decoder Patents"), assigned to the assignee of the present application, the disclosures of which are hereby incorporated by reference into the present application as if set forth fully herein.

System decoder 16 operates to demultiplex the encoded input data stream and extract a single video channel from the data stream and output the data comprising that channel to an input buffer 18. Input buffer 18 comprises a sufficient amount of dynamic random access memory to store the channel extracted by system decoder 16.

According to an alternate embodiment of the present invention, system decoder 16 may be formed on a separate substrate than substrate 12. System decoder 16 may serve to extract multiple channels of information and feed several decoding systems. For example, video data decoding system 10 may operate in parallel with a separate audio decoding system, both operating in parallel on different channels contained within the same encoded data stream. System 10 and the separate audio decoding system may share a system decoder circuit or integrated system decoding system that will serve to demultiplex the input data stream for two or more parallel decoding systems. According to still another embodiment of the present invention, the input buffer 18 could also be shared by parallel decoding systems and could be formed on the same substrate as system decoder 16 or, in the alternative, on a separate dedicated buffer substrate.

The data stored in input buffer 18 is retrieved from input buffer 18 by a parser 20. The data stored in input buffer 18 is Huffman-encoded. The parser 20 functions to decode the Hoffman-encoding. The data stored in input buffer 18 comprises at least two basic sets of information associated with the images to be decoded. The first set of information comprises a set of discreet cosine transform coefficients. This information is compressed by quantizing the information. The information necessary to extract the actual discreet cosine transform coefficients is fed from the parser 20 to a dequantization unit 22, which performs the dequantization function. The dequantized information is then output to an inverse discreet cosine transform circuit 24. Transform circuit 24 operates to perform the inverse discreet cosine transform on the data to form the actual video image data which is output from substrate 12.

The parser 20 also functions to extract the second set of information comprising motion vector data from the data stream stored in input buffer 18. The motion vector information is output from parser 20 off of substrate 12 and into a motion compensation circuit 26 which is shown to comprise motion compensation module 26a and motion compensation module 26b shown resident on substrate 14 in FIG. 1. The transformed video image data is output from inverse discreet cosine transform unit 24 to an input buffer 28 resident on substrate 14.

Motion compensation module 26a comprises a half-pixel arithmetic logic unit 30 and an input buffer 32. Similarly, motion compensation module 26b comprises a half-pixel arithmetic logic unit 34 and an input buffer 36. Arithmetic logic units 30 and 34 receive the motion vector information from the parser 20 and perform the motion compensation calculations to result in differential image data which is stored in input buffers 32 and 36. Motion compensation module 26a also receives video image data from an I-picture frame buffer 38. Similarly, motion compensation module 26b receives video image data from a P-picture frame buffer 40. As will be described herein, the data from the I-picture and P-picture is used by motion compensation modules 26a and 26b to form differential signals which are summed with the data from input buffer 28 in a summation module 42. The output of summation module 42 can be selectively input into I-picture frame buffer 38, P-picture frame buffer 40 or a B-picture frame buffer 44. The picture data stored in I-picture frame buffer 38, P-picture frame buffer 40 or B-picture frame buffer 44 can be output to a raster scan output buffer 46 which retrieves the information from the frame buffers 38, 40 and 44 and outputs the video data to a suitable display system.

According to an alternate embodiment of the present invention, the raster scan output buffer 46 can be physically located on a different substrate than the frame buffers 38, 40 and 44. For example, raster scan output buffer 46 may be advantageously positioned on substrate 12. Raster scan output buffer 46 may also comprise systems to accomplish various post-processing functions including filtering of the video image.

Figure 2:
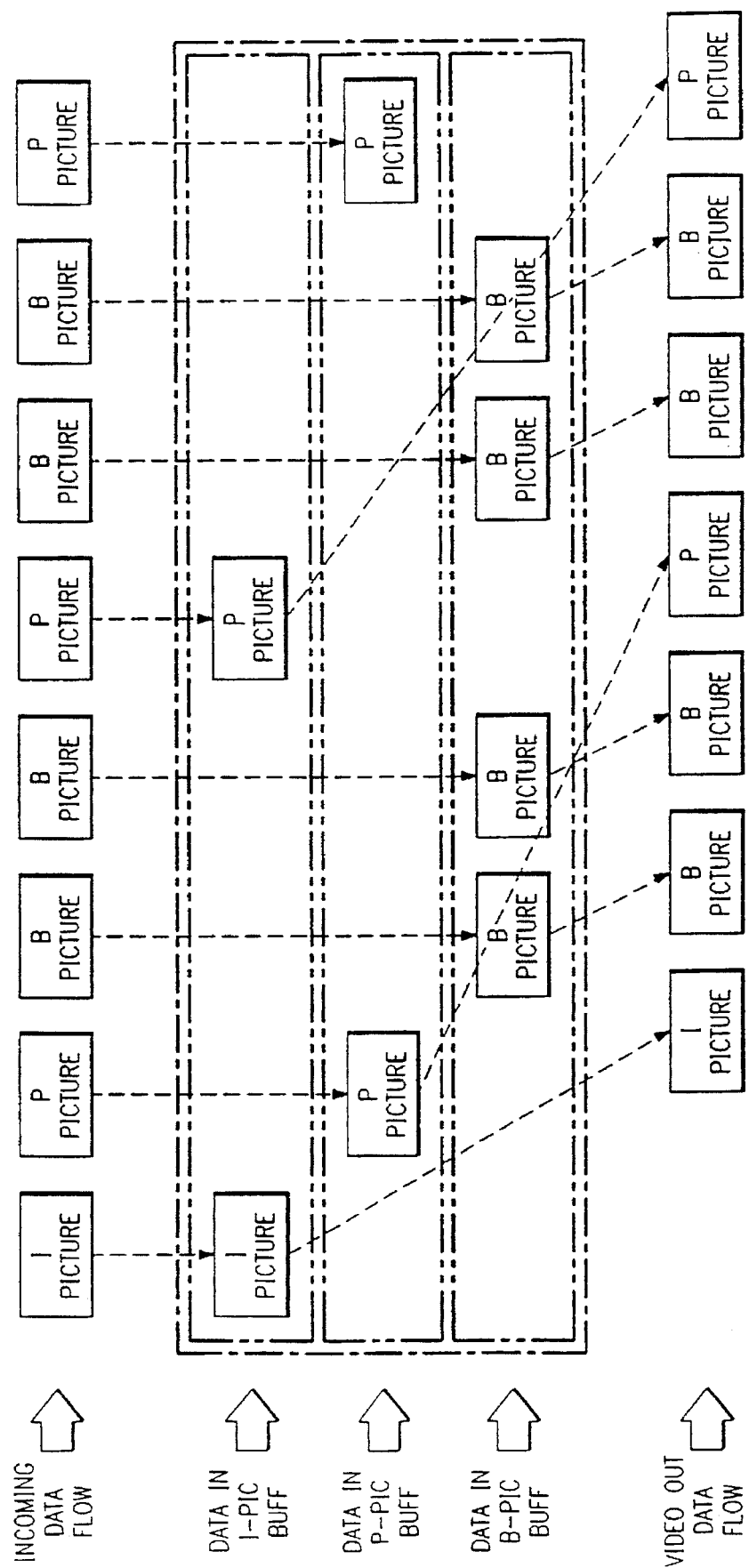
FIG. 2 is a data flow diagram indicating the use of the video data buffers during the processing of video data.

FIG. 2 is a data flow diagram which illustrates the operation of system 10 in decoding a data stream which carries video images encoded using the MPEG syntax. Referring to the top of FIG. 2, the incoming data flow is shown to first contain an I-picture. The correct data stream which is shown at the top of FIG. 2 is retrieved from the multiplexed data stream by the system decoder 16 and placed in the input buffer 18 as discussed previously. The parser 20 then retrieves the data associated with the first I-picture and passes the data directly to dequantization unit 22 and transform unit 24. According to the MPEG syntax, the I-picture has no motion vector associated with it and the resulting image formed by transform circuit 24 will be a full frame of video image data. This frame of data is then passed to input buffer 28 and summed with zero values from motion compensation modules 26a and 26b in summation unit 42. As such, the unchanged image data is passed from input buffer 28 into I-picture frame buffer 38. As shown at the bottom of FIG. 2, the I-picture stored in I-picture frame buffer 38 is the first frame of video data output by raster scan output buffer 46.

The next frame of information from the incoming data stream comprises data associated with a P-picture. The "P" designates a "predicted" picture. The data from the I-picture is used to predict the values of the P-picture. The entire data stream is compressed in the encoding procedure by only encoding the differential between the P-picture and the I-picture and motion vectors which determine the change in position of objects within the frame. As such, the parser 20 retrieves the differential information from the data stream which is dequantized in dequantize unit 22 and transformed in transformation unit 24. The differential signal is then stored in input buffer 28. Similarly, the motion vector information is fed to motion compensator unit 26a. Half-pixel ALU 30 retrieves information from the motion vector and from the I-picture frame buffer to calculate the motion-compensated frame which is output to input buffer 32. The summation unit 42 then sums the compensated frame from input buffer 32 with the differential signal stored in input buffer 28 to result in the full P-picture frame of data. This data is stored in P-picture frame buffer 40.

In order to achieve better predictions, half-pixel ALU 30 and half-pixel ALU 34 are capable of averaging values for neighboring pixels. Single pixels, two pixels or four pixels can be averaged in order to accomplish better motion vector predictability.

The next two images from the incoming data flow comprise B-pictures. B-pictures utilize both forward prediction and backward prediction as B-pictures are positioned between an I-picture and a P-picture in the final data output. As such, the first frame of B-picture information is fed by the parser 20 into the dequantization unit 22 and the transform circuit 24. The output from the transform circuit is once again a differential signal which is input into input buffer 28. The motion vector information associated with the B-picture frame is output to both motion compensation unit 26a and motion compensation unit 26b. The forward prediction is performed in motion compensator 26a by retrieving information from the I-picture frame buffer 38. Similarly, the backward prediction is accomplished in motion compensation unit 26b by retrieving data from the P-picture frame buffer 40. The signals are retrieved from input buffer 28, input buffer 32 and input buffer 36 and averaged together in summation unit 42 before being loaded in B-picture frame buffer 44.

The output data flow shown at the bottom of FIG. 2 illustrates that the I-picture is output after the P-picture has been decoded and loaded into the P-picture frame buffer 40. The two B-picture images are sequentially loaded into B-picture buffer 44 and then immediately output. The next P-picture in the incoming data stream is then loaded into the P-picture frame buffer 38 immediately before the first P-picture is output. The first P-picture is used to decode the second P-picture by using forward predictability. The third and fourth B-pictures are then decoded using both forward and backward predictability using the first and second P-pictures. According to one embodiment of the present invention, an I-picture is included in the data stream approximately once every one-half second to prevent the degradation of the picture quality. After an I-picture has been fully decoded, the next one-half second worth of video frames are each decoded using either forward or forward and backward prediction until the next I-picture occurs.

Referring again to FIG. 1, the advantages of the architecture of the present invention are apparent by examining the communication necessary between substrate 12 and substrate 14 versus the communication necessary between the frame buffers 38, 40 and 44 and the motion compensation modules 26a and 26b. The positioning of the memory required to store the video images used for the subsequent decoding of other video images on the same substrate with the motion compensation modules 26a and 26b which operate to perform the calculations to form the other images provides that the majority of access to video image memory during the operation of system 10 occurs within a single semiconductor substrate. If general purpose memory modules are used to store images which have been decoded, access to the image data necessary for the decoding of other images must be performed through external buses between the motion compensation calculation circuitry and the external memory. In order to provide the necessary speed of operation, these external buses must have a sufficient bandwidth to upload and download entire images in a very rapid manner. For the MPEG to syntax a single frame of data comprises four megabytes of information. As such, the operation of a system using external memory necessitates 16 megabits of external memory with an external bus 64 bits wide. A 64-bit wide external bus is very expensive and consumes a great deal of power to operate. In comparison, the architecture of the present invention allows for the formation of the memory on the same substrate as the motion compensation circuitry. As such, the buses necessary to route information from the video memory to the motion compensation calculation units are formed on the substrate 14. Buses formed on a substrate consume much less power and can be operated much more quickly than external buses. Accordingly, an architecture has been provided that allows for the efficient processing of encoded video data without the implementation of a large external bus. The connection between the substrate 12 and the substrate 14 may comprise one or two 8-bit wide buses for the parallel motion vector transmission and an 8-bit bus to provide for the input to input buffer 28 from transform circuit 24. In addition, these buses will not be used nearly as often as would have been necessary if external memory had been used and external communication was necessary between motion compensation modules 26a and 26b and the frame buffers 38, 40 and 44.

Although the present invention has been described in detail, it should be understood that various changes, alterations, and substitutions may be made to the embodiment described herein without departing from the spirit and scope of the present invention which is solely defined by the appended claims.

What is claimed is:

1. A video data processing system for processing an encoded data stream, comprising:
    a parser circuit formed on a first semiconductor substrate and operable to parse at least a portion of the data stream and to output encoded image data and motion vector data;
    a transformation circuit formed on said first semiconductor substrate coupled to said parser circuit and operable to process said encoded image data;
    a motion compensation circuit coupled to said parser circuit and operable to process said motion vector data, said motion compensation circuit formed on a second semiconductor substrate;
    an image memory circuit formed on said second semiconductor substrate and operable to store data representative of at least one complete frame of video image data, wherein said image memory circuit comprises:
        an I-picture memory operable to store decoded image data representative of a video image of an I-picture retrieved from the encoded data stream, wherein said I-picture is an interframe picture;
        a P-picture memory operable to store decoded image data representative of a video image of a P-picture retrieved from the encoded data stream, wherein said P-picture is a predictive picture; and
        a B-picture memory operable to store decoded image data representative of a video image of an B-picture retrieved from the encoded data stream, wherein said I-picture is a bi-directional picture;
    wherein said motion compensation circuit comprises a first half pixel arithmetic logic unit coupled to said I-picture memory and operable to retrieve video image data from said I-picture memory; and
    wherein said motion compensation circuit comprises a second half pixel arithmetic logic unit coupled to said P-picture memory and operable to retrieve video image data from said P-picture memory in parallel with said retrieval by said first half pixel arithmetic logic unit to said I-picture memory.

2. The system of claim 1 wherein said encoded data stream comprises a plurality of multiplexed data streams and further comprising:
    a system decoder circuit formed on said first semiconductor substrate and operable to demultiplex the encoded data stream to extract a single one of the multiplexer data streams to form a single extracted data stream and to output said single extracted data stream to said parser circuit.

3. The system of claim 2 and further comprising an input buffer circuit formed on said first semiconductor substrate and coupled to said system decoder circuit and said parser circuit and operable to receive from said system decoder circuit and store said single extracted data stream and to output said single extracted data stream to said parser circuit.

4. The system of claim 1 wherein said transformation circuit comprises:
    a dequantization circuit operable to dequantize said image data to form dequantized image data; and
    a discrete cosine transform circuit operable to transform said dequantized image data.

5. The system of claim 1 and further comprising a raster scan output circuit coupled to said image memory circuit and operable to retrieve decoded video image data and to output said decoded video image data from the system.

6. The system of claim 5 wherein said raster scan output circuit is formed on said first semiconductor substrate.

7. The system of claim 5 wherein said raster scan output circuit is formed on said second semiconductor substrate.

8. The system of claim 1 wherein said motion compensation circuit comprises a half pixel arithmetic logic unit.

9. A video data processing system for processing an encoded data stream comprising a plurality of multiplexed data streams, the system comprising:

a system decoder circuit formed on a first semiconductor substrate and operable to demultiplex the encoded data stream to extract a single one of the multiplexed data streams to form a single extracted data stream and to output said single extracted data stream;

an input buffer circuit formed on said first semiconductor substrate and coupled to said system decoder circuit and operable to receive from said system decoder circuit and store said single extracted data stream and to output said single extracted data stream;

a parser circuit formed on said first semiconductor substrate coupled to said input buffer circuit and operable to parse said single extracted data stream and to output encoded image data and motion vector data;

a transformation circuit formed on said first semiconductor substrate coupled to said parser circuit and operable to process said encoded image data;

a motion compensation circuit coupled to said parser circuit and operable to process said motion vector data, said motion compensation circuit formed on a second semiconductor substrate;

an image memory circuit formed on said second semiconductor substrate and operable to store data representative of at least one complete frame of video image data; wherein said image memory circuit comprises:

an I-picture memory operable to store decoded image data representative of a video image of on I-picture retrieved from the encoded data stream, wherein said I-picture is an interframe picture;

a P-picture memory operable to store decoded image data representative of a video image of a P-picture retrieved from the encoded data stream, wherein said P-picture is a predictive picture; and a B-picture memory operable to store decoded image data representative of a video image of on B-picture retrieved from the encoded data stream, wherein said I-picture is a bi-directional picture;

wherein said motion compensation circuit comprises a first half pixel arithmetic logic unit coupled to said I-picture memory and operable to retrieve video image data from said I-picture memory; and wherein said motion compensation circuit comprises a second half pixel arithmetic logic unit coupled to said P-picture memory and operable to retrieve video image data from said P-picture memory in parallel with said retrieval by said first half pixel arithmetic logic unit to said I-picture memory.

10. The system of claim 9 wherein said transformation circuit comprises:

a dequantization circuit operable to dequantize said image data to form dequantized image data; and a discrete cosine transform circuit operable to transform said dequantized image data.

11. The system of claim 9 and further comprising a raster scan output circuit coupled to said image memory circuit and operable to retrieve decoded video image data and to output said decoded video image data from the system.

12. The system of claim 11 wherein said raster scan output circuit is formed on said first semiconductor substrate.

13. The system of claim 11 wherein said raster scan output circuit is formed on said second semiconductor substrate.

14. The system of claim 9 wherein said motion compensation circuit comprises a half pixel arithmetic logic unit.

* * * * *